UNITED STATES PATENT OFFICE.

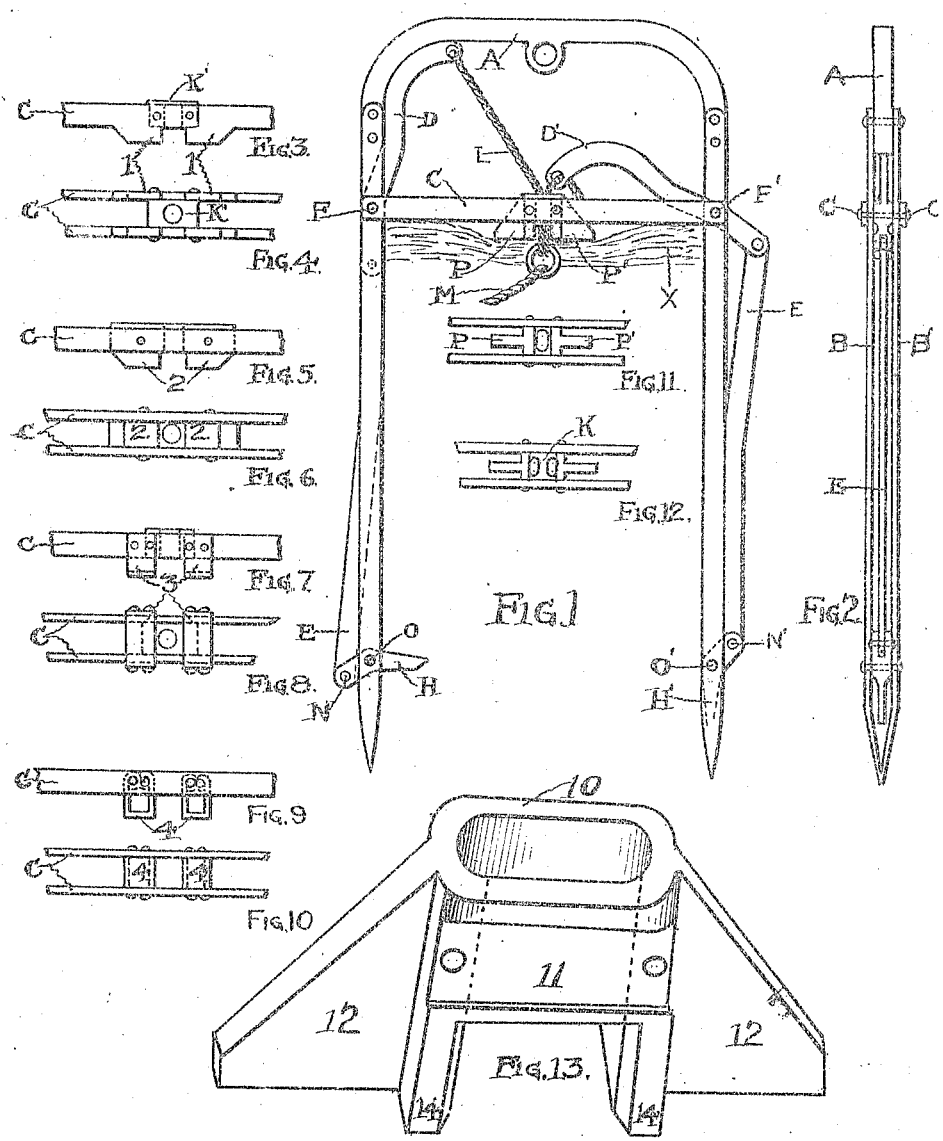

THEODORE THORSON, OF DECORAH, IOWA.

HAY-FORK.

1,263,963. Specification of Letters Patent. Patented Apr. 23, 1918.

Application filed July 2, 1917. Serial No. 178,293.

*To all whom it may concern:*

Be it known that I, THEODORE THORSON, a citizen of the United States, residing at Decorah, in the county of Winneshiek and State of Iowa, have invented certain new and useful Improvements in Hay-Forks, of which the following is a specification.

My improvement relates to what is commonly termed "double-harpoon hay fork". The object of my improvement is to overcome a certain defect inherent in the usual structure of such forks, specifically, the clamping action between the cross bars and the hay which causes the tripping ropes to bind, making it exceedingly difficult to release the load when desired. It is well known among the users of the implement that if the fork is pressed down into the load as deeply as possible it will force the cross bars against the hay and thereby clamp the tripping ropes; this makes it necessary to withdraw the fork slightly which consumes considerable time and strength. It is my object to remedy this difficulty and thereby make the handling of the hay fork easier and render its operation more efficient.

In the annexed drawing which forms part of my specification, Figure 1 is a side view of the fork with one barb in position to retain the load.

Fig. 2 is a side elevation of the fork.

Fig. 3 is a modification showing one way in which my object may be accomplished.

Fig. 4 is a plan view of the modification shown in Fig. 3.

Fig. 5 is an elevation of another modification.

Fig. 6 is a plan view of the modification shown in Fig 5.

Fig. 7 is an elevation of another modification.

Fig. 8 is a plan view of the modification shown in Fig. 7.

Fig. 9 is an elevation of another modification.

Fig. 10 is a plan view of the modification shown in Fig 9.

Fig. 11 is a plan view of the ordinary rope guide used for the tripping rope.

Fig. 12 is a plan view of a double eyeleted rope guide which will prevent the ropes from becoming twisted.

Fig. 13 is a perspective view of the preferred form of my improved rope guide.

Similar letters of reference indicate corresponding parts throughout the several views.

A represents the top or yoke of the frame, formed from flat bar-iron with curved ends, to which the legs or prongs are secured.

B and B' are the prongs, formed by welding two flat bars of iron together at one end and drawn out to form the points or thrust-ends of the prongs. The remainder of the prongs throughout are contructed with a space between them to admit of other parts of the mechanism, as hereinafter described.

C and C' are the tie-bars, also used to sustain the eye hereinafter described.

D and D' are the levers to trip or lock the fork, the upper ends formed to fit the under side of the curved yoke to be protected thereby, and also to bring them more centrally over the eyes.

E and E' are the links that connect the levers with the barbs.

F and F' are the stud-rivets, milled down on each end the proper distance to pass through the prongs and the tie-bars on each end. Thus I am enabled to rivet the two sides of the prongs rigidly to the tie-bars, and allowing sufficient space between the shoulders to admit of the free use of this space for a fulcrum for the levers D and D'.

H and H' are the barbs, designed, with the aid of the links E and E' and the levers D and D', to secure the load to the fork when thrust into the hay, and to release it when carried to the desired location.

K is the double eyed rope-guide, constructed with separate eyes, to prevent the ropes leading to the two levers D and D' from becoming twisted and entangled with each other, as they frequently do when the single-eyed guide is used. Where new rope is employed, this difficulty detracts materially from the effective working of the fork, as in the entanglement of the two ropes it invariably happens that one rope will be shorter than the other and trip one side and leave the other side without tripping, as the shorter rope will receive all of the exertion communicated to the tripping-rope by the operator.

L is the trip-rope, communicating with the levers D and D'.

M is the manipulating-rope, communicating between the operator and the trip-rope on the fork.

N and N' are the rivets connecting the links E and E' with the barbs H and H'.

O and O' are the rivets used as the fulcrums for the barbs H and H'.

P and P' are pieces of metal, or other suitable materials, secured to the cross bars on either side of the rope-guide and extending downwardly to a distance of one inch or over so that the hay X will be pressed away as shown leaving a free space between it and the cross bars wherein the ropes L may slide freely.

Having described the different parts of the fork, as indicated by letters, I will give you the mode of operating the same. Press the levers D and D' down into the position as shown at D' in Fig. 1. This action causes the barbs H and H', through the agency of the links E and E', to close within the space between the sides of the prongs B and B', thus leaving the points free of obstruction. Then thrust the prongs into the hay to the desired depth, and raise the levers D and D' into the position as shown at D in Fig. 1. This action of the levers D and D' is communicated by the links E and E' to the barbs H and H', causing them to turn into the position as shown at H in Fig. 1. In this position the fork retains the load until it is lifted into the mow or other desired place. By drawing the rope M the levers D and D' are drawn down into the position as shown at D' in Fig. 1. When the load is released, the fork may be drawn back to the operator by the rope M.

In Fig. 13 I have shown what I consider at present, to be the most desirable form of rope-guide embodying my invention. 10 represents the body portion through which the trip rope passes. 11 are recessed portions on each side for receiving the cross bars c. At each end of the body portion 10 are outwardly and downwardly extending flanges 12 which project for a considerable distance below the body portion 10. On each side of the opening 13, I preferably provide flanges 14 next to the opening 13 although this is not essential to the proper working of my invention.

It is seen that my invention is such that any fork may readily be changed so as to embody my improvement by merely removing the old rope-guide and replacing it with one embodying my invention. Although my actual improvement is limited to changes in the rope-guide itself it is believed that a new and patentable combination has been invented for the reason that the entire operation of the fork has been modified to some extent making it easier to operate the fork both when loading and unloading the same, and my invention in its broadest form consists in adding to the ordinary hay fork, of the harpoon type, means such as P and P' which will prevent the hay from clamping the trip rope L.

It is obvious that my invention may be carried out by many different specific means which will perform the same function in substantially the same way and I have shown four different modifications. In Fig. 3 I have shown a modification in which the cross bars c have downwardly extending projections 1 on each side of the rope-guide. In Fig. 5 the rope-guide is provided with integral downwardly extending projections 2 on each side. In Fig. 7 the U-shaped members 3 are riveted to the bars c on each side of the rope-guide while in Fig. 9 the usual rope-guide has been omitted and two members 4 bent and secured to the cross bars c in the manner shown perform the double function of rope-guide and anti-clamping means.

The various modifications shown are not believed to exhaust the various ways in which my invention may be carried out but are merely illustrative and I desire to claim my invention as broadly as possible in view of the art.

Having thus described my invention, what I claim as new, and wish to secure by Letters Patent is—

1. In a hay fork, in combination, two parallel harpoon penetrating members, each of said members being provided with a hay retaining barb, means for rendering said barb operative said means comprising a system of toggles, an operative member connected to said toggles for breaking the same, tie bars connecting the parallel harpoon members, an eyelet secured to said tie bars, said operating members extending through said eyelet to the underside of said tie bars and means projecting downwardly in proximity to said eyelet whereby the pressure of the hay will be prevented from binding the operative members.

2. In a hay fork; a U-shaped frame the sides of which form parallel prongs, hay retaining barbs at the ends of said prongs, tie bars connecting said prongs, means for operating said barbs, said means comprising ropes passing between the tie bars to the underside of said bars and means connected to said tie bars for preventing clamping action between the hay and the bars at the point where the operating ropes pass through the same.

3. In a hay fork; a U-shaped frame the sides of which form parallel prongs, hay retaining barbs at the ends of said prongs, tie bars connecting said prongs, means for operating said prongs comprising a system of toggles and a rope attached to each toggle, the rope passing between the tie bars to the underside of the same and means for preventing the hay from clamping the rope against the underside of the tie bars, said means being provided with an opening which permits the free passage of the rope.

4. An article of manufacture comprising a body portion having a hole extending transversely therethrough, flanges at each end of said body portion being in a plane substantially parallel to the axis of the hole, said flanges extending beyond the body portion on one side in the direction of the axis of said hole whereby an opening is provided through which a trip rope may freely slide.

5. A rope-guide for a harpoon hay fork comprising a body portion, adapted to be secured to the cross bars of a hay fork, said body portion having a hole therethrough, means at each end of the body portion projecting to one side of the same, in the direction of the axis of the hole whereby an opening is provided which permits the guide-ropes to move freely and prevents them from being clamped by the hay.

THEODORE THORSON.